United States Patent
Penton et al.

(10) Patent No.: US 11,194,577 B2
(45) Date of Patent: Dec. 7, 2021

(54) INSTRUCTION ISSUE ACCORDING TO IN-ORDER OR OUT-OF-ORDER EXECUTION MODES

(71) Applicant: Arm Limited, Cambridge (GB)

(72) Inventors: Antony John Penton, Little Canfield (GB); Simon John Craske, Cambridge (GB); Vladimir Vasekin, Cambridge (GB)

(73) Assignee: ARM LIMITED, Cambridge (GB)

( * ) Notice: Subject to any disclaimer, the term of this patent is extended or adjusted under 35 U.S.C. 154(b) by 332 days.

(21) Appl. No.: 15/571,915

(22) PCT Filed: Apr. 11, 2016

(86) PCT No.: PCT/GB2016/051001
§ 371 (c)(1),
(2) Date: Nov. 6, 2017

(87) PCT Pub. No.: WO2016/193656
PCT Pub. Date: Dec. 8, 2016

(65) Prior Publication Data
US 2018/0088951 A1     Mar. 29, 2018

(30) Foreign Application Priority Data

Jun. 5, 2015  (GB) .................................... 1509743

(51) Int. Cl.
*G06F 9/30* (2018.01)
*G06F 9/38* (2018.01)

(52) U.S. Cl.
CPC ........ *G06F 9/30123* (2013.01); *G06F 9/3005* (2013.01); *G06F 9/30076* (2013.01);
(Continued)

(58) Field of Classification Search
None
See application file for complete search history.

(56) References Cited

U.S. PATENT DOCUMENTS 5,581,778 A   12/1996   Chin et al.
5,956,493 A   9/1999   Hewitt et al.
(Continued)

FOREIGN PATENT DOCUMENTS

GB   2527927   1/2016

OTHER PUBLICATIONS

International Search Report and Written Opinion of the ISA for PCT/GB2016/051001, dated Jun. 20, 2016, 21 pages.
(Continued)

*Primary Examiner* — John M Lindlof
(74) *Attorney, Agent, or Firm* — Nixon & Vanderhye, P.C.

(57) ABSTRACT

Apparatus for processing data (2) includes issue circuitry (22) for issuing program instructions (processing operations) to execute either within real time execution circuitry (32) or non real time execution circuitry (24, 26, 28, 30). Registers within a register file (18) are marked as non real time dependent registers if they are allocated to store a data value which is to be written by an uncompleted program instruction issued to the non real time execution circuitry and not yet completed. Issue policy control circuitry (42) responds to a trigger event to enter a real time issue policy mode to control the issue circuitry (22) to issue candidate processing operations (such as program instruction, micro-operations, architecturally triggered processing operations etc.) to one of the non real time execution circuitry or the real time execution circuitry in dependence upon whether that candidate processing operation reads a register marked as a non real time dependent register.

23 Claims, 5 Drawing Sheets

(52) U.S. Cl.
CPC .......... *G06F 9/30189* (2013.01); *G06F 9/384* (2013.01); *G06F 9/3842* (2013.01); *G06F 9/3863* (2013.01); *G06F 9/3889* (2013.01)

(56) References Cited

U.S. PATENT DOCUMENTS

| | | | |
|---|---|---|---|
| 8,473,724 B1* | 6/2013 | Kenville | G06F 9/30076 712/229 |
| 2002/0038416 A1 | 3/2002 | Fotland et al. | |
| 2006/0212682 A1 | 9/2006 | Baxter et al. | |
| 2007/0204137 A1* | 8/2007 | Tran | G06F 9/30181 712/214 |
| 2008/0250226 A1 | 10/2008 | Eickemeyer et al. | |
| 2014/0281402 A1* | 9/2014 | Comparan | G06F 9/30189 712/214 |
| 2015/0006856 A1 | 1/2015 | Rash et al. | |

OTHER PUBLICATIONS

Search Report for GB 1509743.9, dated Dec. 15, 2015, 4 pages.
Examination Report dated Mar. 26, 2021, issued in GB Application No. GB 1509743.9 (3 pages).

\* cited by examiner

INSTRUCTION ISSUE ACCORDING TO IN-ORDER OR OUT-OF-ORDER EXECUTION MODES

This application is the U.S. national phase of International Application No. PCT/GB2016/051001 filed 11 Apr. 2016, which designated the U.S. and claims priority to GB Patent Application No. 1509743.9 filed 5 Jun. 2015, the entire contents of each of which are hereby incorporated by reference.

This disclosure relates to data processing systems. More particularly, this disclosure relates to issue policy control within data processing systems.

It is known to provide data processing systems in which program instructions may be issued to pipelines under control of an issue policy.

Viewed from one aspect the present invention provides apparatus for processing data comprising:

issue circuitry to issue processing operations for execution;

non real time execution circuitry to execute processing operations issued to said non real time execution circuitry by said issue circuitry;

real time execution circuitry to execute processing operations issued to said real time execution circuitry by said issue circuitry;

one or more registers to store data values, respective registers of said one or more registers having associated indicators to indicate for a given register when said given register is a non real time dependent register allocated to store a data value written by an uncompleted processing operation issued to said non real time execution circuitry; and issue policy control circuitry to respond to a trigger event to enter a real time mode to control said issue circuitry to issue a candidate processing operation to one of said non real time execution circuitry and said real time execution circuitry in dependence upon whether that said candidate processing operation reads a non real time dependent register.

Viewed from another aspect the present disclosure provides apparatus for processing data comprising:

issue means for issuing processing operations for execution;

non real time execution means for executing processing operations issued to said non real time execution means by said issue means;

real time execution means for executing processing operations issued to said real time execution means by said issue means;

one or more register means for storing data values, respective register means of said one or more register means having associated indicators to indicate for a given register means when said given register means is a non real time dependent register means allocated to store a data value written by an uncompleted processing operation issued to said non real time execution means; and issue policy control means for responding to a trigger event to enter a real time mode to control said issue circuitry to issue a candidate processing operation to one of said non real time execution means and said real time execution means in dependence upon whether that said candidate processing operation reads a non real time dependent register means.

Viewed from a further aspect the present invention provides a method of processing data comprising:

issuing processing operations for execution to a selected one of non real time execution circuitry and real time execution circuitry;

storing data values in one or more registers, respective registers of said one or more registers having associated indicators to indicate for a given register when said given register is a non real time dependent register allocated to store a data value written by an uncompleted processing operation issued to said non real time execution circuitry; and in response to a trigger event, entering a real time mode to control said issue of a candidate processing operation to one of said non real time execution circuitry and said real time execution circuitry in dependence upon whether that said candidate processing operation reads a non real time dependent register.

Example embodiments will now be described, by way of example only, with reference to the accompanying drawings in which:

FIG. 1 schematically illustrates a data process apparatus including non-real time execution circuitry and real time execution circuitry;

FIG. 2 schematically illustrates a program instruction including a destination register specifier;

FIG. 3 is a flow diagram schematically illustrating switching between a real time issue policy and a non real time issue policy;

FIG. 4 schematically illustrates a real time issue policy;

Figure 1:
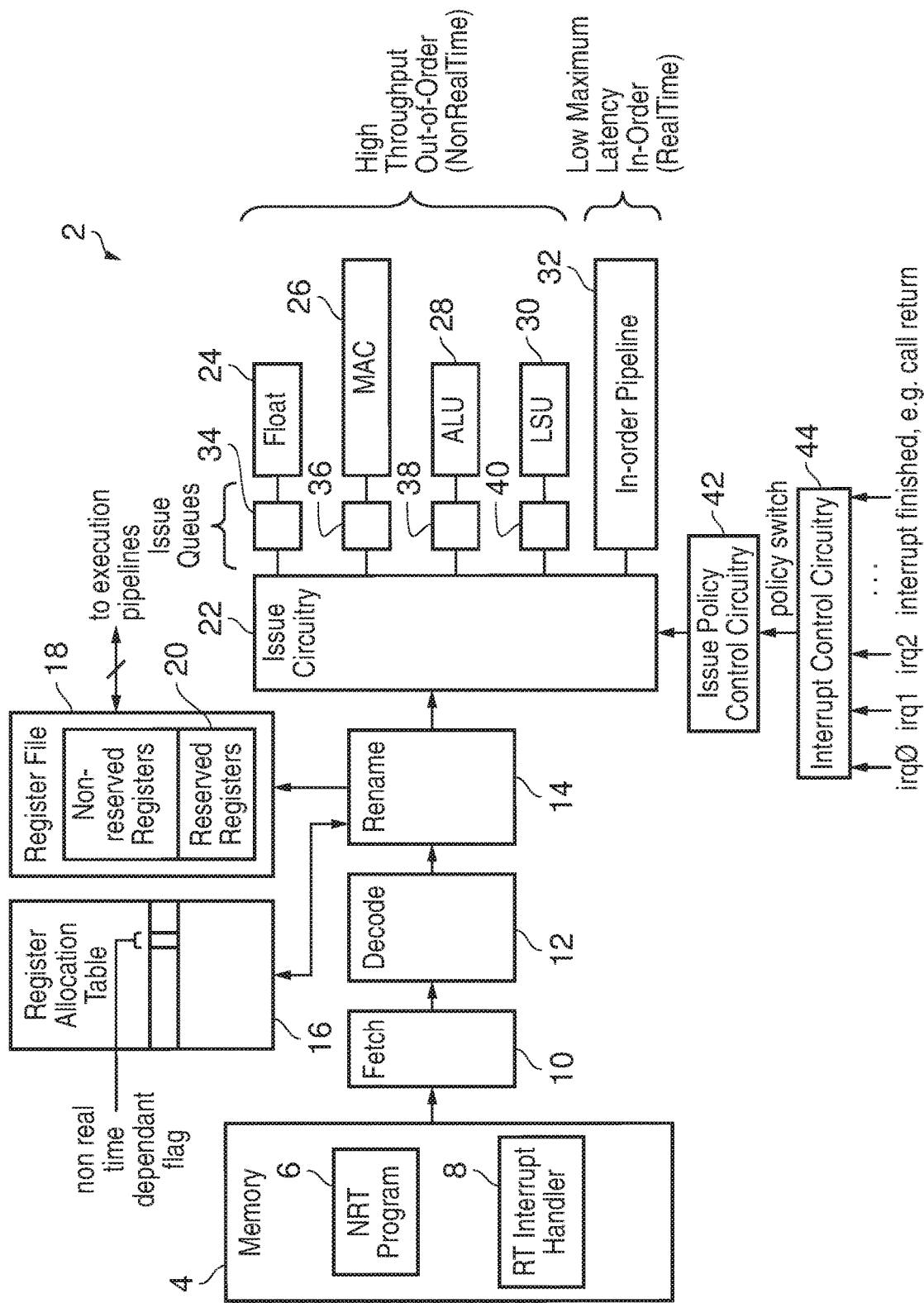

FIG. 1 schematically illustrates an apparatus for data processing 2 including a memory 4 storing a non real time program 6 (such as, for example, a non critical program permitting a user to configure a display) and a real time program 8 (such as, for example, a real time interrupt handler for performing car engine management or antilock braking system operation). Program instructions read from the memory 4 are fetched by a fetch stage 10 (fetch circuitry) and then passed in turn to a decode stage 12 (decode circuitry) and a register renaming stage 14 (register renaming circuitry). The data processing apparatus 2 is able to operate in a non real time execution mode in which out-of-order pipelines 24, 26, 28, 30 are used to support out-of-order processing. The data processing apparatus 2 also operates in a real time mode in which an in-order pipeline 32 is used to support in-order processing. The out-of-order pipelines 24, 26, 28, 30 are, in this example embodiment, the non real time execution circuitry that typically has a higher average instruction execution rate than real time execution circuitry in the form of the in-order pipeline 32. The real time execution circuitry typically has a lower maximum instruction execution latency than the non real time execution circuitry and also has a lower variation in instruction execution latency than the non real time execution circuitry. In general terms, program instructions processed by the in-order pipeline 32 will typically execute a slower rate, but with more deterministic behavior.

When operating in the non real time mode, the rename stage 14 performs register renaming upon the decoded program instructions using a register allocation table 16 to store register mapping data for the registers within the register file 18. A portion of the registers within the register file 18 are reserved registers 20 which are reserved for use by the real time execution circuitry are not utilized by the non real time execution circuitry.

Program instructions (i.e. one or more processing operations a program instruction may be broken down into multiple processing operations, which could be executed by the same or different pipelines from the rename stage 14 (whether renaming has or has not been performed) are passed to issue circuitry 22 where they are issued (via respective issue queues 34, 36, 38, 40) to either the non real time execution circuitry comprising execution pipelines 24, 26, 28, 30 in accordance with out-of-order processing techniques, or alternatively to the in-order pipeline 32 in accordance with in-order processing techniques. Issue policy control circuitry 42 serves to control (select) the issue policy that is used. The issue policy may be either a non real time issue policy or a real time issue policy. Interrupt control circuitry 44 receives external interrupt signals and triggers execution of associated interrupt handling programs, together with triggering a policy switch, where specified by the interrupt configuration data, from non real time processing to real time processing.

It may be desirable for some program code to be executed in accordance with the real time issue policy in order that it may have more deterministic behaviour (e.g. a lower maximum latency) even though the non real time issue policy may be able to achieve higher average instruction throughput. In the present example embodiment switching from non real time issue policy to real time issue policy may be controlled by a trigger event in the form of a received interrupt signal. Other forms of trigger event are also possible, such as a software interrupt (SWI) or execution of an explicit switch instruction should this be provided. A reset event may be used to switch back from the real time issue policy to the non real time issue policy. The reset event again can take a number of different forms, such as completion of execution of interrupt handling program instructions, a call return, an exception return, or execution of a specific switch instruction within the program instruction stream.

When a switch is made from the non real time issue policy to the real time issue policy, there will typically be a number of pending instruction "in flight" (issued, partially processed, but not yet completed (retired), i.e. uncompleted processing operations) within the out-of-order pipelines 24, 26, 28, 30. Some of these instructions may write data values to destination registers within the register file 18. Given the non deterministic behaviour of the out-of-order pipelines 24, 26, 28, 30, it may be a relatively long time before such output operands are written to the destination registers concerned for these "in flight" instructions within the non real time execution circuitry. As an example, a load to a register within the register file 18 performed by the load store unit 30 may result in a cache miss and then a long latency main memory access requiring many hundreds of processing cycles before that destination register is written with the data value returned from main memory.

The issue circuitry 22 is able to reduce the impact of this delay, at least to some extent, by using a real time issue policy in which non real time dependent registers are identified in the register allocation table 16 and an instruction which reads such a non real time dependent register is issued by the issue circuitry 22 to the non real time execution circuitry rather than to the real time execution circuitry. Thus, the non real time execution circuitry is able to use its existing dependency control mechanisms to ensure that the program instruction which reads the non real time dependent register is executed in an appropriate order relative to writing of that non real time dependent register. However, using the real time issue policy, program instructions which do not read any non real time dependent registers are issued into the real time execution circuitry in the form of the in-order pipeline 32. This permits processing which is not dependent upon pending processing within the non real time execution circuitry to proceed within the real time execution circuitry without undue delay.

The identification of registers within the register file 18 as non real time dependent registers may be achieved using a non real time dependent flag within the data held by the register allocation table. When the rename stage 14 renames a register being used by the non real time execution circuitry and notes that a write is to be made to that register by the non real time execution circuitry, then the non real time dependent flag is set for that register. The out-of-order processing techniques utilized by the non real time execution circuitry may include techniques such as speculative writing of data values to registers within the register file 18. In this case, a program instruction executed by the non real time execution circuitry will be completed when its corresponding program instruction is retired indicating that it is no longer speculative and the data value (which may have been generated some time before) held within the non real time dependent register is confirmed as architectural state of the system.

In the above discussion, the processing workload has been considered to be formed of program instructions which are passed either to the non real time execution circuitry or the real time execution circuitry. It will be appreciated by those in this field that the processing workload associated with program instructions may in practice, for example, be broken down into smaller units, such as breaking down a program instruction into microoperations, or processing operations associated with changes of state of the system as a whole, e.g. processing operations associated with interrupt signals which may trigger state saving operations, status register writes and the like which are performed in addition to and alongside processing operations specified by program instructions. Such processing operations may be issued into the non real time execution circuitry or the real time execution circuitry by the issue circuitry 22 in dependence upon whether the non real time issue policy or the real time issue policy is in force and in accordance with the techniques discussed above in relation to the real time issue policy and its relationship to non real time dependent registers.

Figure 2:
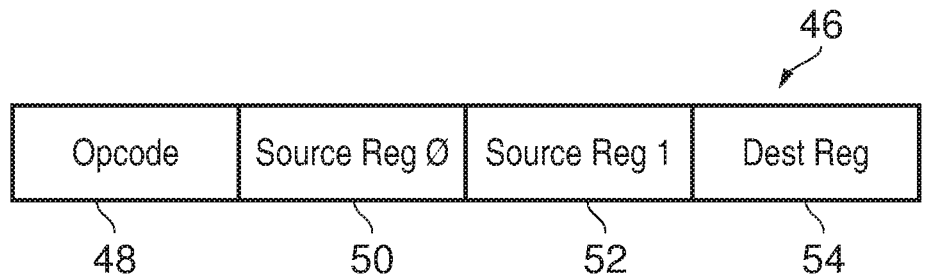

FIG. 2 schematically illustrates a program instruction 46 which includes an opcode 48, a first source register specifier 50, a second source register specifier 52 and a destination register specifier 54. If the program instruction 46 is issued into the non real time execution circuitry, e.g. in the form of the out-of-order pipelines 24, 26, 28, 40, then the register within the register file 18 corresponding to the destination register specifier 54 is marked within the register allocation table 16 by a flag to indicate that it is a non real time dependent register. This flag may in turn may be used when the real time issue policy is in force to ensure that a program instruction (or more generally processing operations as discussed above) that reads that non real time dependent register before its non real time dependence flag status has been cleared will be issued into the non real time execution circuitry and so be properly ordered with respect to the preceding instruction which writes that non real time dependent register.

Figure 3:
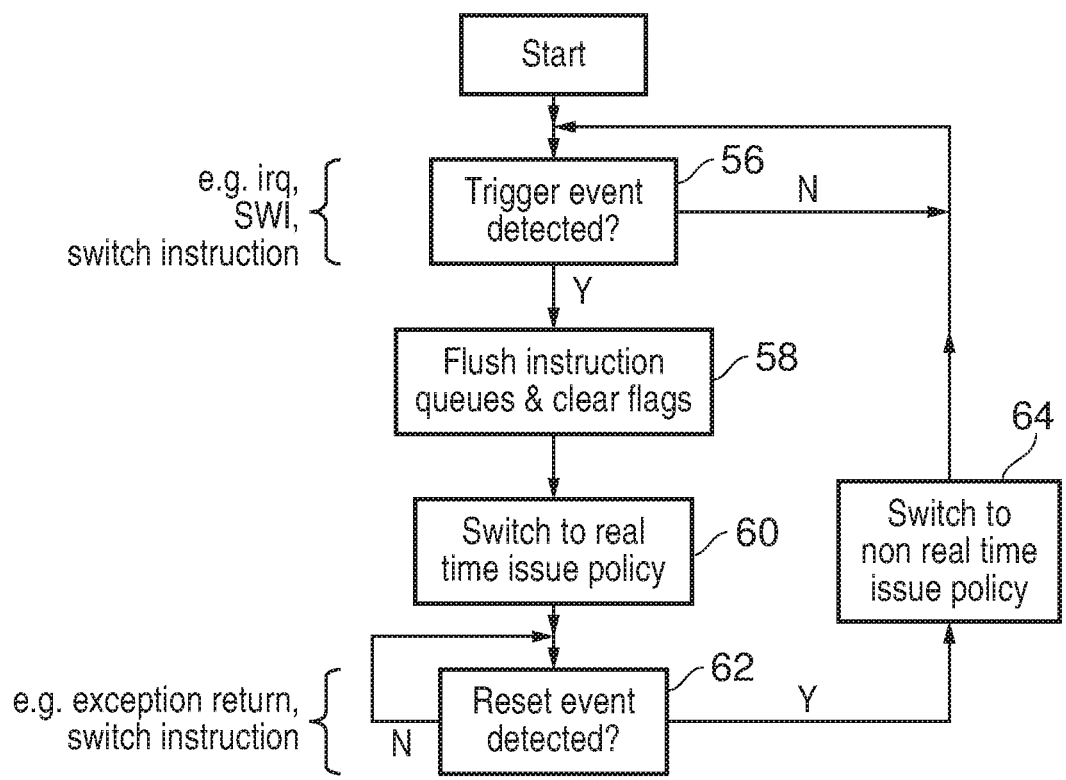

FIG. 3 is a flow diagram schematically illustrating switching between a non real time issue policy and a real time issue policy. Processing starts at step 56 with the non real time issue policy in use. Processing waits at step 56 until a trigger event is detected. This trigger event may be, for example, a received physical interrupt signal, a software interrupt or execution of an explicit switch instruction. Other forms of trigger event are also possible. When a trigger event has been detected, then step 58 serves to flush the program instructions (or processing operations) held within the issue queues 34, 36, 38, 40. (in some embodiments one or more of the issue queues may not be flushed, e.g. instructions certain to commit can be left, whether or not instructions must be flushed can depend upon, for example, how the out-of-order pipeline resolves branches and/or faults). As the instructions within the issue queues 34, 36, 38, 40 are flushed before their execution starts within the out-of-order pipelines 24, 26, 28, 30, there are no uncompleted "in flight" processing operation which will write to a non real time dependent register for those flushed instructions and accordingly the non real time dependent flags for those flushed instructions can be cleared within the register allocation table 16. Step 60 switches to the real time issue policy as discussed above. Processing waits at step 62 until a reset event is detected. The reset event could take a variety of different forms, such as, for example, an exception return or an explicit reset instruction. When a reset event is detected, then step 64 switches from the real time issue policy to the non real time issue policy.

Figure 4:
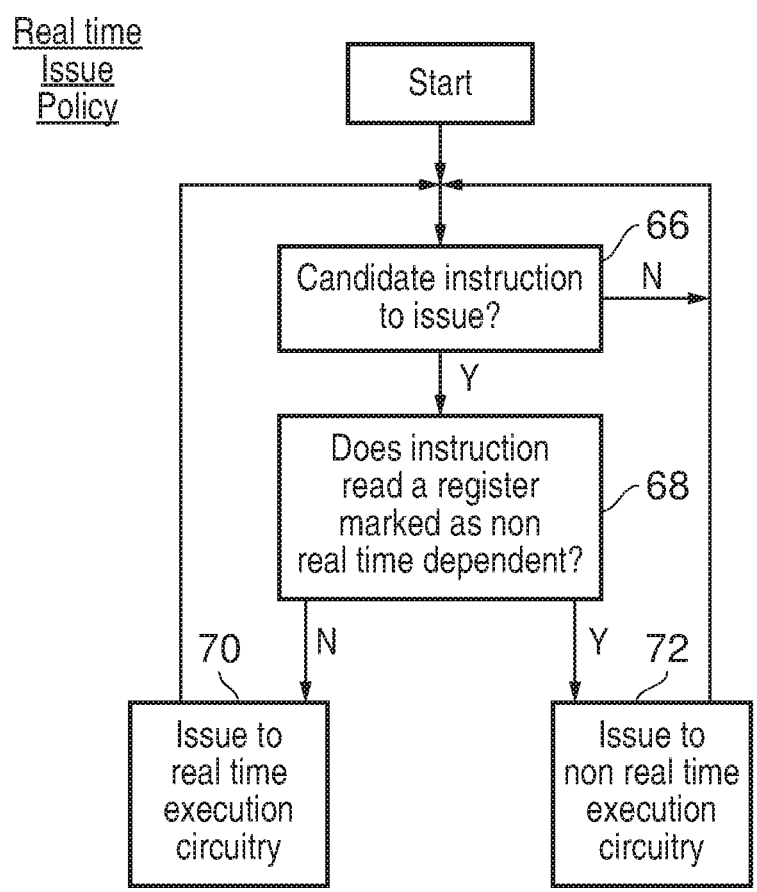

FIG. 4 is a flow diagram schematically illustrating operation in accordance with the real time issue policy. Processing waits at step 66 until there is a candidate instruction (processing operation) to issue. Step 68 then determines whether the candidate instruction reads a register which is marked as a non real time dependent register within the register allocation table 16. If the instruction does not read any non real time dependent registers, then it is issued to the real time execution circuitry at step 70. If the instruction does read a register marked as a non real time dependent register, then the instruction is issued to the non real time execution circuitry at step 72.

In some example embodiments there may be an additional step between steps 68 and 70 which serves to issue at least some instructions to the non real time execution circuitry during the real time mode even if those instructions do not read any registers marked as non real time dependent. Thus, in such embodiments not all instructions that do not read non real time dependent registers need to be sent to the real time execution circuitry. Instead a proportion may continue to be sent to the non real time execution circuitry such that a desired balance between throughput and latency may be achieved. The proportion of instructions "voluntarily" sent to the non real time execution circuitry during the real time mode could be varied (e.g. user configured) depending on the throughput vs latency balance desired for a particular implementation or use.

In some example embodiments a user defined tolerated-latency-setting may be provided (e.g. a flag(s) in configuration registers) that corresponds to different sets of processing operations continuing to be issued by the issue circuitry to the non real time execution circuitry even though they do not read any non real time dependent registers. The candidate processing operations to be issued will have different associated maximum latency value when executed by the non real time processing circuitry, e.g. in relative order of maximum latency—simple arithmetic and logic processing operations (ADD, SUB, AND, OR, . . . ), complex arithmetic processing operations (DIV, SQRT), flushable load/store processing operations, and non-flushable load/store processing operations (e.g. access to memory regions marked strongly ordered). Different sets of processing operation selected in accordance with this ordering may continue to be issued to the non real time execution circuitry depending on the user setting indicating the maximum tolerated latency required by the user.

Figure 5:
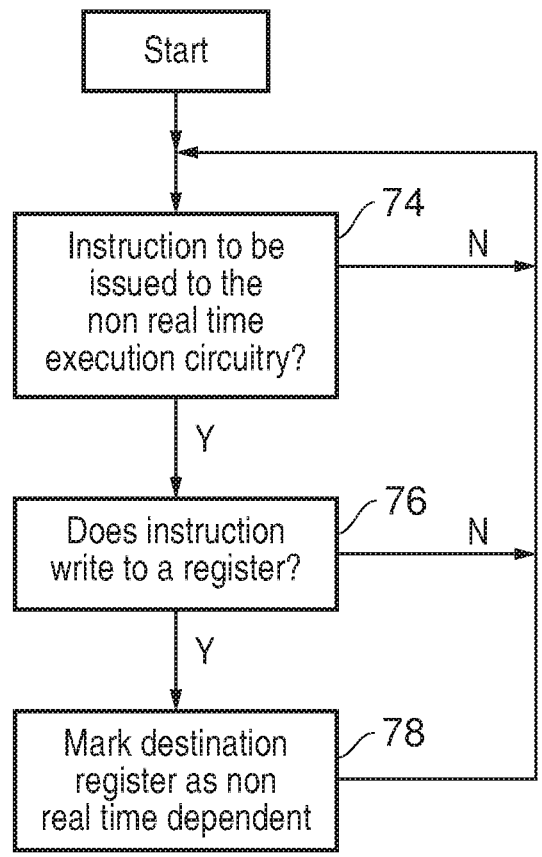
FIG. 5 is a flow diagram schematically illustrating marking registers as non real time dependent.

FIG. 5 is a flow diagram schematically illustrating marking of registers as non real time dependent registers. At step 74 processing waits until an instruction is encountered by the rename stage 14 that is to be issued by the issue circuitry 22 to the non real time execution circuitry (i.e. is subject to the non real time issue policy). When an instruction is to be issued to the non real time execution circuitry, step 76 determines whether it writes to a register (a destination register). If the instruction does write to a register, then step 78 marks that destination register as a non real time dependent register.

Figure 6:
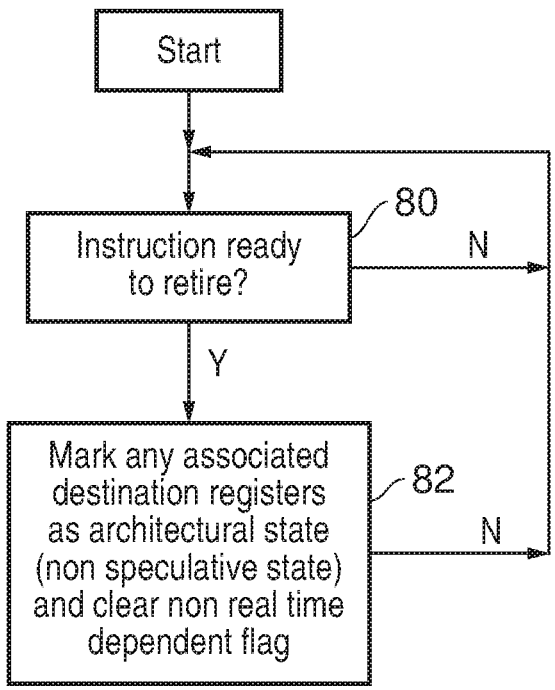
FIG. 6 is a flow diagram schematically illustrating the clearing of non real time dependent marking for registers.

FIG. 6 is a flow diagram schematically illustrating one mechanism for clearing a non real time dependent register flag. At step 80 processing waits until an instruction is ready to retire from the non real time execution circuitry (e.g. it has completed execution and become non speculative). When an instruction retired, any destination registers associated with that instruction are henceforth treated as architectural state (non speculative state) and the non real time dependent flags associated with any of those destination registers are cleared. These operations occur at step 82. As previously mentioned, non real time dependent flags for destination registers may also be cleared for program instructions (processing operations) flushed from the issue queues 34, 36, 38, 40 before they are issued into the out-of-order pipelines 24, 26, 28, 30 respectively. Other flag clearing mechanisms are also possible.

Figure 7:
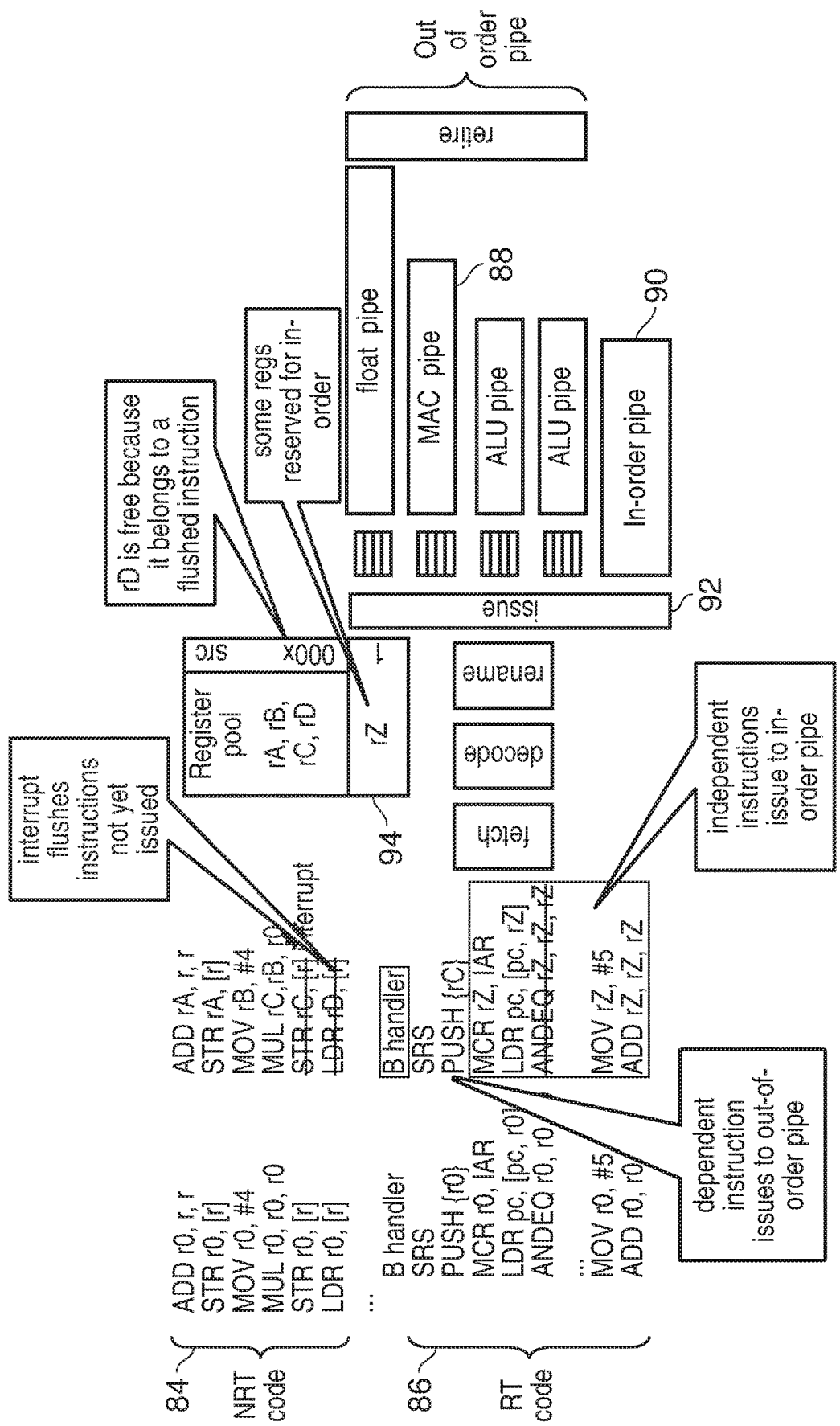
FIG. 7 schematically illustrates example code including an interrupt handler and to which of the non real time execution circuitry and the real time execution circuitry respective instructions are issued.

FIG. 7 schematically illustrates example program code including non real time code 84 whose execution is interrupted by an interrupt signal triggering execution of real time code 86. The real time code 86 is an interrupt handler. The non real time code 84 is interrupted after a multiply instruction MUL has been issued into the multiply accumulate pipeline 88 of non real time execution circuitry. The multiply instruction MUL is accordingly "in flight" and its destination register rC is marked a non real time dependent register. The instructions of the non real time code 84 following the MUL instruction, namely the STR instruction and the LDR instruction, are flushed before they commence execution within the out-of-order pipelines.

At the beginning of the real time code a stack writing instruction PUSH is to be performed in respect of register r0, which corresponds to the register rC, i.e. is a non real time dependent register as it is to be written by the "in flight" MUL instruction within the multiply accumulate pipeline 88. Accordingly, even though the interrupt which has arisen has switched the system to use of the real time issue policy, the stack writing instruction PUSH is issued into the non real time execution circuitry. Conversely, the instructions within the real time code 86 following the stack writing instruction PUSH do not make any reads of non real time dependent registers. Accordingly, they are issued into the in-order pipeline 90 by the issue circuitry 92. The in-order pipeline circuitry 90 uses reserved registers 94 which are available for its immediate use. These reserved registers 94 may include registers which have an architectural specifier corresponding to a non real time dependent register as the real time issue policy will ensure that they are only issued into the in-order pipeline 90 if they do not read from the non real time dependent register concerned.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

The invention claimed is:

1. Apparatus for processing data comprising:
   issue circuitry to issue processing operations for execution;
   non real time execution circuitry to execute processing operations issued to said non real time execution circuitry by said issue circuitry, wherein the non real time execution circuitry comprises a dependency control mechanism to ensure that processing operations involving reading of a register are executed in an appropriate order relative to processing operations involving writing of the register;
   real time execution circuitry to execute processing operations issued to said real time execution circuitry by said issue circuitry;
   one or more registers to store data values, respective registers of said one or more registers having associated indicators to indicate for a given register when said given register is a non real time dependent register allocated to store a data value written by an uncompleted processing operation issued to said non real time execution circuitry; and
   issue policy control circuitry operable in a real time mode or a non real time mode wherein, when operating in the real time mode, the issue policy control circuitry is to control said issue circuitry:
      to select, for a candidate processing operation, one of the non real time execution circuitry and the real time execution circuitry to which to issue said candidate processing operation based on whether said candidate processing operation reads a non real time dependent register,
      to issue said candidate processing operation to said non real time execution circuitry when said candidate processing operation reads a non real time dependent register, and
      to issue said candidate processing operation to said real time execution circuitry when said candidate processing operation is independent of any non real time dependent register;
      wherein the issue policy control circuitry is to enter the real time mode in response to a trigger event.

2. Apparatus as claimed in claim 1, wherein when in a non real time mode said issue policy control circuitry controls said issue circuitry to issue processing operations to said non real time execution circuitry.

3. Apparatus as claimed in claim 1, when in said real time mode said issue circuitry issues at least some processing operations that do not read a non real time dependent register to said non real time execution circuitry.

4. Apparatus as claimed in claim 3, wherein, in said real time mode, a user defined tolerated-latency-setting controls said issue circuitry to issue to said non real time execution circuitry processing operations that do not read a non real time dependent register and have less than a tolerated maximum interrupt latency when executed by said non real time execution circuitry.

5. Apparatus as claimed in claim 4, wherein said user defined tolerated-latency-setting corresponds to one of a plurality of sets of processing operations having less than said tolerated maximum interrupt latency.

6. Apparatus as claimed in claim 5, wherein said processing operations include in relative order of maximum interrupt latency when executed by said non real time execution circuitry: simple arithmetic and logic processing operations, complex arithmetic processing operations, flushable load and store operations, and non-flushable load and store operations.

7. Apparatus as claimed in claim 1, wherein said candidate processing operation corresponds to a candidate program instruction.

8. Apparatus as claimed in claim 1, wherein said non real time execution circuitry is out-of-order execution circuitry to perform out-of-order execution of said processing operations.

9. Apparatus as claimed in claim 8, wherein said out-of-order execution circuitry comprises register renaming circuitry to support speculative writing of data values to said one or more registers.

10. Apparatus as claimed in claim 9, wherein program instruction completion includes retirement of a speculatively executed program instruction.

11. Apparatus as claimed in claim 1, wherein said real time execution circuitry is in-order execution circuitry to perform in-order execution of said processing operations.

12. Apparatus as claimed in claim 1, wherein said trigger event is an interrupt trigger event triggering a redirection of program flow to execute interrupt handling processing operations.

13. Apparatus as claimed in claim 12, comprising interrupt control circuitry to receive one or more interrupt signals, wherein said interrupt trigger event corresponds to receipt of an interrupt signal by said interrupt control circuitry.

14. Apparatus as claimed in claim 1, wherein said issue circuitry comprises an issue queue to store processing operations awaiting issue and in response to said trigger event, said issue circuitry flushes said issue queue.

15. Apparatus as claimed in claim 1, wherein said associated indicators comprise respective flag values for said one or more registers, said flag values marking upon issue of a processing operation to said non real time execution circuitry registers that are output operand destination registers of said processing operations.

16. Apparatus as claimed in claim 1 comprising one or more reserved registers reserved for use to store respective operands value of processing operations executed by said real time execution circuitry.

17. Apparatus as claimed in claim 1, wherein said issue policy control circuitry responds to a reset event to enter a non real time mode to control said issue circuitry to issue said candidate processing operation to said non real time execution circuitry.

18. Apparatus as claimed in claim 17, wherein said trigger event is an interrupt trigger event triggering a redirection of program flow to execute interrupt handling processing operations; and
   wherein said reset event is completion of execution of said interrupt handling processing operations.

19. Apparatus as claimed in claim 1, wherein said non real time execution circuitry has a higher average instruction execution rate than said real time execution circuitry.

20. Apparatus as claimed in claim 1, wherein real time execution circuitry has a lower maximum instruction execution latency than said non real time execution circuitry.

21. Apparatus as claimed in claim 1, wherein real time execution circuitry has a lower variation in instruction execution latency than said non real time execution circuitry.

22. Apparatus for processing data comprising:
issue means for issuing processing operations for execution;
non real time execution means for executing processing operations issued to said non real time execution means by said issue means, wherein the non real time execution means comprises a dependency control mechanism to ensure that processing operations involving the reading of a register means are executed in an appropriate order relative to processing operations involving writing of the register means;
real time execution means for executing processing operations issued to said real time execution means by said issue means;
one or more register means for storing data values, respective register means of said one or more register means having associated indicators to indicate for a given register means when said given register means is a non real time dependent register means allocated to store a data value written by an uncompleted processing operation issued to said non real time execution means; and
issue policy control means operable in a real time mode or a non real time mode wherein, when operating in the real time mode, the issue policy control means is to control said issue means:
to select, for a candidate processing operation, one of the non real time execution means and the real time execution circuitry means to which to issue said candidate processing operation based on whether said candidate processing operation reads a non real time dependent register means,
to issue a candidate processing operation to said non real time execution means when said candidate processing operation reads a non real time dependent register means, and
to issue said candidate processing operation to said real time execution means when said candidate processing operation is independent of any non real time dependent register means;
wherein the issue policy control means is to enter the real time mode in response to a trigger event.

23. A method of processing data comprising:
issuing processing operations for execution to a selected one of non real time execution circuitry and real time execution circuitry, wherein the non real time execution circuitry comprises a dependency control mechanism to ensure that processing operations involving reading a register are executed in an appropriate order relative to processing operations involving writing of the register;
storing data values in one or more registers, respective registers of said one or more registers having associated indicators to indicate for a given register when said given register is a non real time dependent register allocated to store a data value written by an uncompleted processing operation issued to said non real time execution circuitry;
controlling issue of a candidate processing operation according to a real time mode or a non real time mode by selecting, for the candidate processing operation, one of the non real time execution circuitry and the real time execution circuitry to which to issue said candidate processing operation based on whether said candidate processing operation reads a non real time dependent register;
entering the real time mode in response to a trigger event; and
in the real time mode controlling said issue of said candidate processing operation to:
issue said candidate processing operation to said non real time execution circuitry when said candidate processing operation reads a non real time dependent register, and
issue said candidate processing to said real time execution circuitry when said candidate processing operation is independent of any non real time dependent register.

* * * * *